(12) United States Patent
Kim

(10) Patent No.: US 6,275,204 B1
(45) Date of Patent: Aug. 14, 2001

(54) CIRCUIT FOR DRIVING ADDRESS ELECTRODES OF A PLASMA DISPLAY PANEL SYSTEM

(75) Inventor: Se-Yong Kim, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/241,398

(22) Filed: Feb. 2, 1999

(30) Foreign Application Priority Data

Jun. 30, 1998 (KR) ............................................. P98-25741
Jun. 30, 1998 (KR) ............................................. P98-25745

(51) Int. Cl.[7] ..................................................... G09G 3/28
(52) U.S. Cl. ................................ 345/72; 345/60; 345/546
(58) Field of Search ................................ 345/60, 67, 80, 345/55, 63, 68, 90, 64, 65, 546

(56) References Cited

U.S. PATENT DOCUMENTS 5,436,634 * 7/1995 Kanazawa ............................... 345/67
5,789,862 * 8/1998 Makino .................................. 313/584
5,828,356 * 10/1998 Stoller .................................... 345/60
5,962,983 * 10/1999 Anderson et al. ................. 315/169.4
6,034,482 * 3/2000 Kanazawa et al. ..................... 345/67

* cited by examiner

Primary Examiner—Steven Saras
Assistant Examiner—Fritz Alphonse
(74) Attorney, Agent, or Firm—Pillsbury Winthrop LLP

(57) ABSTRACT

A circuit for driving address electrodes of a plasma display panel system is disclosed. A data interfacing section outputs red, green and blue data arranged on 12 columns×107 rows to an address electrode driving IC. The address electrode driving IC has 4 input pins for receiving 4 bits of the red, green and blue data from the data interfacing section over 18 times and 72 output pins for outputting the received red, green and blue data. Accordingly, each of the address electrode driving ICs processes the red, green and blue data corresponding to a multiple of 12. That is, the red, green and blue data arranged on an identical row of the interfacing section having the red, green and blue data arranged in 12 columns×107 rows are inputted in an identical address electrode driving IC. Accordingly, the data interfacing section can execute an operation for outputting the red, green and blue data although all of 1280 units of the red, green and blue data are not inputted. Consequently, a storage capacity of the data interfacing section can be reduced and a cost of production of the flat panel display apparatus can be reduced.

2 Claims, 7 Drawing Sheets

CIRCUIT FOR DRIVING ADDRESS ELECTRODES OF A PLASMA DISPLAY PANEL SYSTEM

BACKGROUND OF THE INVENTION

1. Field of the Invention

The present invention relates to a flat panel display apparatus, and more particularly, to a circuit for driving address electrodes of a plasma display panel system, which is capable of increasing efficiency of a circuit design and a data transmittal of the flat panel display apparatus adopting a red-green-blue strip-type plasma display panel (referred to as "PDP").

2. Description of the Prior Art

Currently, as television sets (referred to as "TV") have become more widely used, consumers are demanding slim display apparatuses which have wide screens and which are easily installable. In view of consumers' needs, the existing cathode ray tube (referred to as "CRT") has started to reveal limitations thereof. Thus, the existing display equipment such as the CRT has come to be replaced by a so-called flat panel display (referred to as "FPD") apparatus that has a wide display area and that is slim as well. Further, recently, research projects therein are in progress enthusiastically at home and abroad.

This kind of the FPD device is largely divided into an emissive device and a non-emissive device. The emissive device is usually called an active emitting device and is a device which emits a light by itself. Representative examples of the emissive device are a field emission display (referred to as "FED") device, a vacuum fluorescent display (referred to as "VFD") type device, an electro-luminescence (referred to as "EL") type device, a plasma display panel (referred to as "PDP") and the like. The non-missive device is called a passive light emitting device, and representative examples of the non-emissive device are a liquid crystal display (referred to as "LCD") device, an electro-chromic display (referred to as "ECD"), an electro-chromic image display (referred to as "EPID") and the like.

Currently, the LCD device occupies the main stream in products such as desk clocks, calculators, lap-tops and the like. However, when this device is adopted to television sets having the screen size of 21 inches and over, it also shows the limitations up to now due to problems in a manufacturing process of a panel and in obtaining an acceptable product. Further, it has the disadvantages of having a narrow visual field angle and of having a response rate which is subject to a temperature variation. Recently, the PDP is newly attracting public attention as the flat panel display of the next generation which is capable of solving the problems of the LCD device.

Because the PDP emits a light by itself in a principle which is similar to that of a fluorescent lamp, it has a uniform brightness and a high contrast although a screen area is as wide as the screen area of the CRT. In addition, the PDP has a visual field angle of 140 degrees and above, and is well-known as the best wide screen display device which has a screen size of 21 to 55 inches. The panel manufacturing process of the PDP is simplified as compared with that of the LCD device and thereby saves a manufacturing cost. However, because the manufacturing cost of the PDP is more than that of the CRT, manufacturers are carrying out searches to reduce the manufacturing cost.

The plasma display is largely classified into a direct current (referred to as "DC") type and an alternating current (referred to as "AC") type according to a structural difference of a discharge cell thereof and a form of a driving voltage based on the structural difference. The DC type is driven by a DC voltage, whereas the AC type is driven by a sinusoidal AC voltage or by a pulse voltage. The AC type includes such a structure that a dielectric layer covers an electrode to serve as a current regulation resistor, whereas the DC type includes such a structure that an electrode is exposed to a discharge room as it is and that a discharge current comes to flow during a supply of the discharge voltage. Because the AC type has the electrode which is covered with the dielectric, it is more durable than the DC type. The AC type has a further advantage in that a wall electric charge which is generated on a surface of the dielectric as a result of a polarization, causes the cell to have a memory function therein, and is more applicable in the field of display devices than the others.

A color PDP includes a structure of 3 terminals wherein a special electrode is installed in order to improve discharge characteristics thereof. Namely, the 3-terminal air structure comprises 3 electrodes per unit cell for display which are an address electrode for entering data, a maintenance electrode for sequentially scanning a line and for maintaining a cell discharge, and a bus electrode for helping a discharge maintenance.

A number of the address electrode for entering data is determined in accordance to a horizontal resolution. For example, in the case where a number of samples per line is 853 for each of the red, green and blue colors, a total number of the samples comes to 2559. Therefore, a required number of the address electrodes is also 2559. In the case where an arrangement of the address electrode has a strip form, red, green and blue electrodes are arranged repeatedly.

As described above, because a circuit arrangement of an electrode driving section is restricted considering a space utilization when thousands the address electrodes are arranged on one side, an upper and lower electrode driving system is adapted wherein the section for driving 1280 electrodes, which are ordered in an odd-numbered sequence, are arranged at an upper end portion of a panel whereas the section for driving 1279 electrodes, which are ordered in an even-numbered sequence, are arranged at a lower end portion thereof (refer to U.S. Pat. No. 4,695,838).

Meanwhile, in order to display a TV signal of a system of national television system committee (referred to as "NTSC") on the PDP, a data processing section converts an interlaced scanning system into a sequential scanning system, and also converts data into data of a subfield system for a PDP contrast processing. Further, the data processing section provides 1280 red-green-blue (referred to as "RGB") pixel data per line to the electrode driving section for driving the upper and lower address electrodes of the panel of the PDP in harmony with the arrangement of the address electrode.

Conventionally, a video data of the PDP is transferred by a data rearranging section for rearranging digital RGB sample data into subfield data for a contrast processing, by a frame memory section for converting one scanning system into the other, by a data interfacing section for outputting previously-latched 2559 pixel data to the upper and lower electrode driving sections in harmony with the arrangement of the upper and lower electrodes while latching 2559 pixel data corresponding to 1 line which is supplied from the memory section, and by upper and lower address electrode driving integrated circuits for outputting the ROB data provided from the data interfacing section to the address electrode.

At this time, 1280 units of the RGB data are arranged in a memory region for the upper and lower address electrodes of the data interfacing section as 12 columns ×107 rows of a matrix, the arranged RGB data are inputted to the upper and lower address electrode driving sections by 80 bits over 16 times, respectively. Also, the RGB data of the memory region for the upper address electrode are arranged in the respective columns in red, blue and green sequence, and the RGB data of the memory region for the lower address electrode arranged in the respective columns in green, red and blue sequence.

The upper and lower driving sections have 20 units of address electrode driving ICs arranged in upper and lower portions of the display panel, and each of the address electrode driving ICs have four input pins for receiving 4 bits of RGB data over 16 times from the data interfacing section and 64 output pins for outputting 64 bits of the RGB data inputted over 16 times to the address electrode.

However, since the address electrode driving IC has the four input pins and the 64 output pins, some of the RGB data arranged in an identical row of the data interfacing section having the RGB arranged in the 12 columns ×107 rows are not inputted to an identical address electrode driving IC.

Accordingly, the data interfacing section stores the RGB data until the RGB data corresponding to one line are perfectly inputted from the memory section, and the data interfacing section outputs the stored RGB data to the respective address electrode driving ICs when the RGB data corresponding to the one line are inputted. Consequently, a storage capacity of the data interfacing section has to be designed such a volume that the RGB data corresponding to the one line can be stored.

SUMMARY OF THE INVENTION

Therefore, it is an object of the present invention to provide a circuit for driving address electrodes of a plasma display panel system, which is capable of increasing efficiency of a circuit design and a data transmittal.

In order to achieve the above object, in an AC type plasma display panel system, a circuit for driving address electrodes of the plasma display panel system by using red, green and blue data stored in a frame memory means, which comprises:

a data interfacing means for temporarily storing the red, green and blue data supplied from said frame memory, wherein the red, green and blue data are stored in a matrix form of M columns ×N rows, and for outputting the stored red, green and blue data; and an address electrode driving means for receiving the red, green and blue data from said data interfacing means and for outputting the received red, green and blue data to the address electrodes, wherein said address electrode driving means includes a plurality of address electrode driving integrated circuits which respectively have G number of output pins, where the number G is a multiple of the number M.

In the present invention, one of the address electrode driving IC processes the RGB data corresponding to the multiple of 12. That is, the RGB data arranged on the identical row of interfacing section 14c having the RGB data arranged in 12 columns ×107 rows are inputted into an identical address electrode driving IC and are outputted to display panel 28. Accordingly, data interfacing section 14c can execute an operation for outputting the RGB data although all of 1280 units of the RGB data are not inputted. Consequently, a storage capacity of data interfacing section 14c can be reduced and a cost of production of the flat panel display apparatus can be reduced.

BRIEF DESCRIPTION OF THE DRAWINGS

The above object and other advantages of the present invention will become more apparent by describing in detail a preferred embodiment thereof with reference to the attached drawings, in which.

DESCRIPTION OF THE PREFERRED EMBODIMENT

A description will be given below in detail with reference to accompanying drawings to a configuration and an operation of a circuit for driving address electrodes of a plasma display panel system according to embodiments of the present invention.

Figure 1:
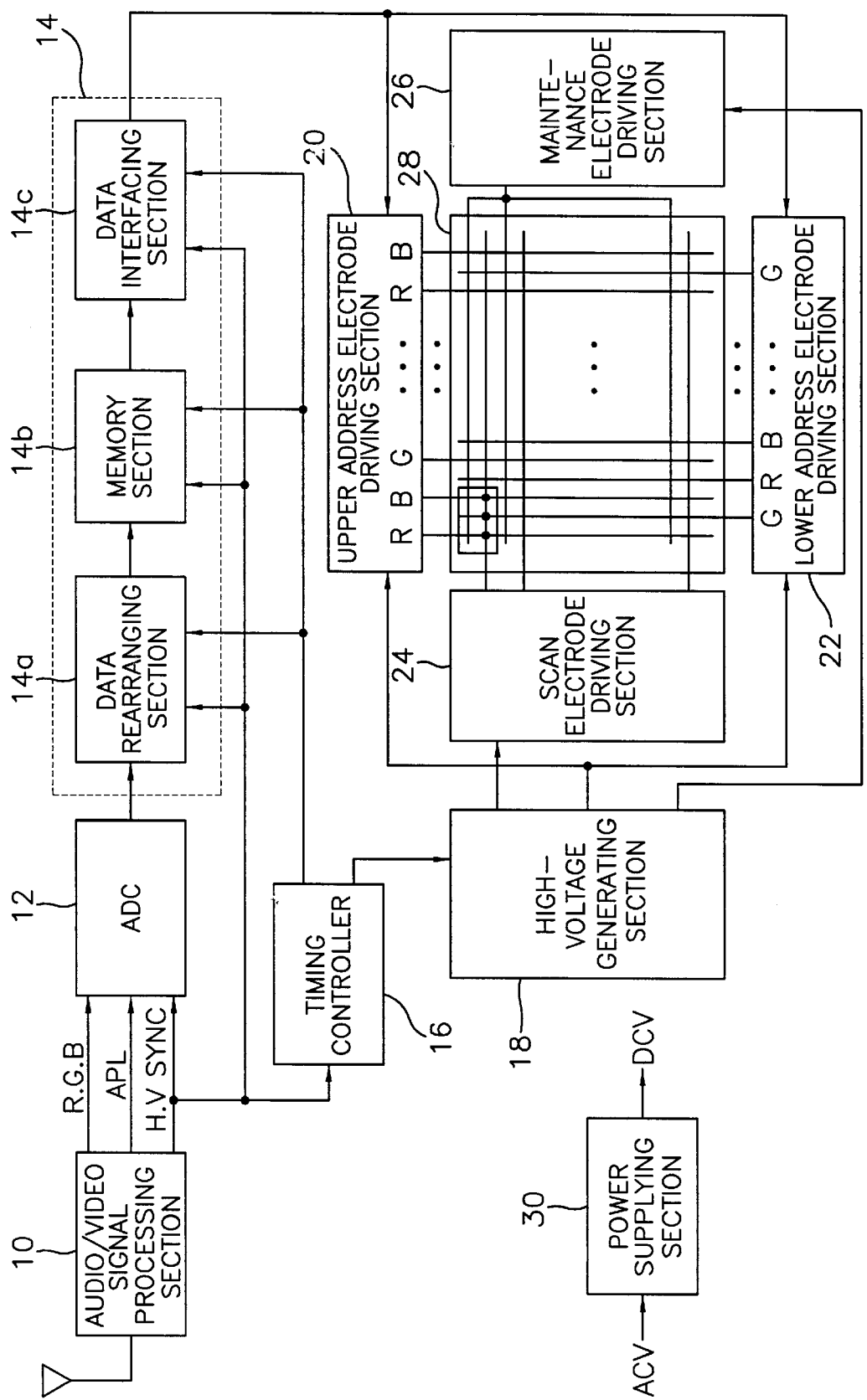
FIG. 1 is a block diagram for showing a circuit diagram of a plasma display panel set which is a preferred embodiment of a flat panel display apparatus according to the present invention.

FIG. 1 is a block diagram for showing a circuit configuration of a plasma display panel television set which is a preferred embodiment of a flat panel display apparatus according to the present invention. A PDP-TV includes a video processing section for converting an NTSC composite video signal into a signal form which is adapted to the PDP-TV system, and a driving circuit section for displaying processed video data via a panel thereof.

Broadly speaking, a composite video signal which is received via an antenna, is analog-processed by an audio/video (referred to as "A/V") signal processing section 10, and an analog-processed signal is then digitized to a prescribed video signal by an analog-to-digital converter (referred to as "ADC") 12. Afterwards, while passing through a data rearranging section 14a, memory section 14b and data interfacing section 14c of a data processing section 14, this video data is converted into a data stream which is adapted to a contrast-processing characteristics of the PDP, and a converted data stream is then provided to an address electrode driving section 20 and 22.

Under the control of a timing control section 16, a high-voltage generating section 18 provides a high-voltage control pulse which is required by an upper address electrode driving section 20, a lower address electrode driving section 22, a scan electrode driving section 24 and a maintenance electrode driving section 26, and a power supplying section 30 inputs an AC voltage (referred to as "ACV") to produce all of DC voltages (referred to as "DCV's") which are required by a whole system.

A/V signal processing section 10 inputs the NTSC composite video signal to separate an analog RGB and a horizontal or vertical synchronizing signal H.V SYNC, and produces an average picture level (referred to as "APL"), which corresponds to an average value of a luminance signal, and, which is then provided to ADC 12.

The interlaced scanning system is adopted for the NTSC composite video signal whose one frame consists of two fields of respectively even-and odd-numbered sequences, and whose horizontal and vertical synchronizing signals have frequencies of 15.73 [KHz] and 60 [Hz], respectively. An audio signal which is separated from the composite video signal is directly provided to a speaker via an audio amplifier.

ADC 12 inputs the analog RGB signal to convert an inputted analog RGB signal into digital data, and provides converted digital data to data processing section 14. Here, the digital data is video data whose signal form is converted for a brightness improvement of the PDP-TV system. ADC 12 amplifies the analog RGB signal and the APL signal to have signal levels thereof which are adapted to a quantization, and converts the vertical and horizontal synchronizing signals to have prescribed phases thereof. Also, ADC 12 generates a clock by using a phase-locked loop (referred to as "PLL") in order to use a sampling clock as a clock which is synchronized with an input synchronizing signal.

The PLL compares a phase of a variable pulse from a loop with a phase of an input synchronizing signal, and provides a clock which is synchronized with the input synchronizing signal. In the case where the clock, which is not synchronized with the input synchronizing signal, is used, a vertical linearity of a picture to be displayed is not ensured.

Also, ADC 12 sets vertical and horizontal positions of a sampling area. In a vertical position section, only lines which include the video signal among the input signals are set. In a horizontal position section, only time which includes the video signal among the lines which is set to the vertical position, is set. Both the vertical position section and the horizontal position section are a reference for a sampling. As illustrated in Table 1, a total of 480 lines is selected in the 240 lines of units for the vertical position section. The horizontal position section has to correspond to a time interval in which at least 853 sampling clocks can exists per line.

Also, ADC 12 maps the RGB data to data which coincides with a brightness characteristic of the PDP and outputs a mapped RGB data. Namely, ADC 12 includes a read only memory (referred to as "ROM") which has a plurality of vector tables recorded therein, and then maps an optimal vector table read from the ROM 1 to 1 in accordance with a digitized APL data to provide an improved form of RGB data to data processing section 14.

TABLE 1

| | 1 frame | | |
|---|---|---|---|
| items | odd | even | remarks |
| a total line | 1H-262.5H | 262.5H-525H | NTSC TV |
| an active line | 22H-263H | 284H-525H | |
| a selective line | 23H-262H | 285H-524H | |

In order to process the contrast of the PDP, data rearranging section 14a of data processing section 14 is required to reconfigure the video data into a plurality of subfields, and then to rearrange data bits from the most significant bit (referred to as "MSB") to the least significant bit (referred to as "LSB"). Data rearranging section 14a performs rearrangement so that the video data provided in parallel may be stored at a location specified by an address of a frame memory as bits having the same weight.

Here, in order to distinguish data for the upper address electrode from data for the lower address electrode, there is configured one word in which among respective 8 1-bit data with respect to rearranged red and blue, 4 1-bit data in an odd-numbered sequence are placed at an upper bit while 4 1-bit data in an even-numbered sequence are placed at a lower bit, and in which among 8 1-bit data with respect to a rearranged green, 4 1-bit data in an odd-numbered sequence are placed at a lower bit while 4 1-bit data in an even-numbered sequence are placed at an upper bit.

Because memory section 14b of data processing section 14 divides one field into eight subfields for the contrast processing of the PDP, and reads in series the video data corresponding to respective subfields in harmony with an arrangement order of the electrodes to provide the read video data to data interfacing section 16, a read order is quite different from a write order structurally.

Data interfacing section 14c rearranges the RGB data from memory section 14b in harmony with an arrangement of an RGB pixel of a display section 28 and provides a rearranged RGB data to an address driving integrated circuit (referred to as "IC"). Namely, data interfacing section 14c provisionally stores the RGB data from memory section 14b and then respectively provides read RGB data to upper and lower address electrode driving sections 20 and 22 in a data form which is required by upper and lower address electrode driving sections 20 and 22.

High-voltage generating section 18 combines the DC high-voltages with each other in accordance with a control pulse having various logic levels from timing control section 16, and produces the high-voltage control pulse which is required by upper address electrode driving section 20, lower address electrode driving section 22, scan electrode driving section 24, and maintenance electrode driving section 26, which enables the PDP to be driven. Upper and lower address electrode driving sections 20 and 22 adequately heighten a voltage level of the data from data interfacing section 14c and a selective entry can be executed into display section 28.

Namely, a driving method for the contrast processing of the PDP according to the present invention, first, divides one field into a plurality of subfields, i.e., 256 contrast—8 subfields, and enters the video data corresponding to respective subfields in the line of unit into display section 28 via upper and lower address electrode driving sections 20 and 22. The method sets a number of a discharge maintenance pulses to a smaller one in an order starting from the subfield having MSB data entered therein to the subfield having LSB data entered therein, and comes to perform the contrast-processing on the basis of a total discharge maintenance period according to a combination therebetween.

Upper and lower address electrode driving sections 20 and 22 includes 20 driving IC's which have both 4-bit input pins and 64-bit output pins. Thus, respective driving sections load the data corresponding to one line alternately in an even or an odd order over 32 times total in 40 units from data interfacing section 14c, and then drive one line of electrodes simultaneously.

The same data is displayed twice in even and odd fields and thereby eliminates a flickering which accompanies a non-interlacing scan. A driving order of the divided subfields is described as follows.

1) An Entry and Elimination of a Whole Screen

In order to eliminate a wall electric charge which remains at a selected pixel after a discharge maintenance of a previous subfield, the wall electric charge is entered into a whole pixel for a short time which is not enough to be visible, and the whole pixel is then eliminated to eliminate all of the remaining wall electric charges and an initialization is achieved.

2) The Entry of Data

While shifting a scan pulse in sequence at a scan electrode, a relevant data is entered in the line of unit via an address electrode, and thereby forming the wall electric charge at a pixel which is intended to be discharged.

3) A Maintenance of a Discharge

The discharge of a pixel having the wall electric charge which is formed therein while alternately applying the maintenance pulse between the maintenance electrode and the scan electrode is initiated and is then maintained. At this time, because there exists a possibility of a peripheral pixel, which is entered, influencing another pixel, which is not entered, to produce an erroneous discharge, an elimination of a narrow range is performed every time after applying the maintenance pulse, and a correct discharge is then performed.

Embodiment 1

Figure 2:
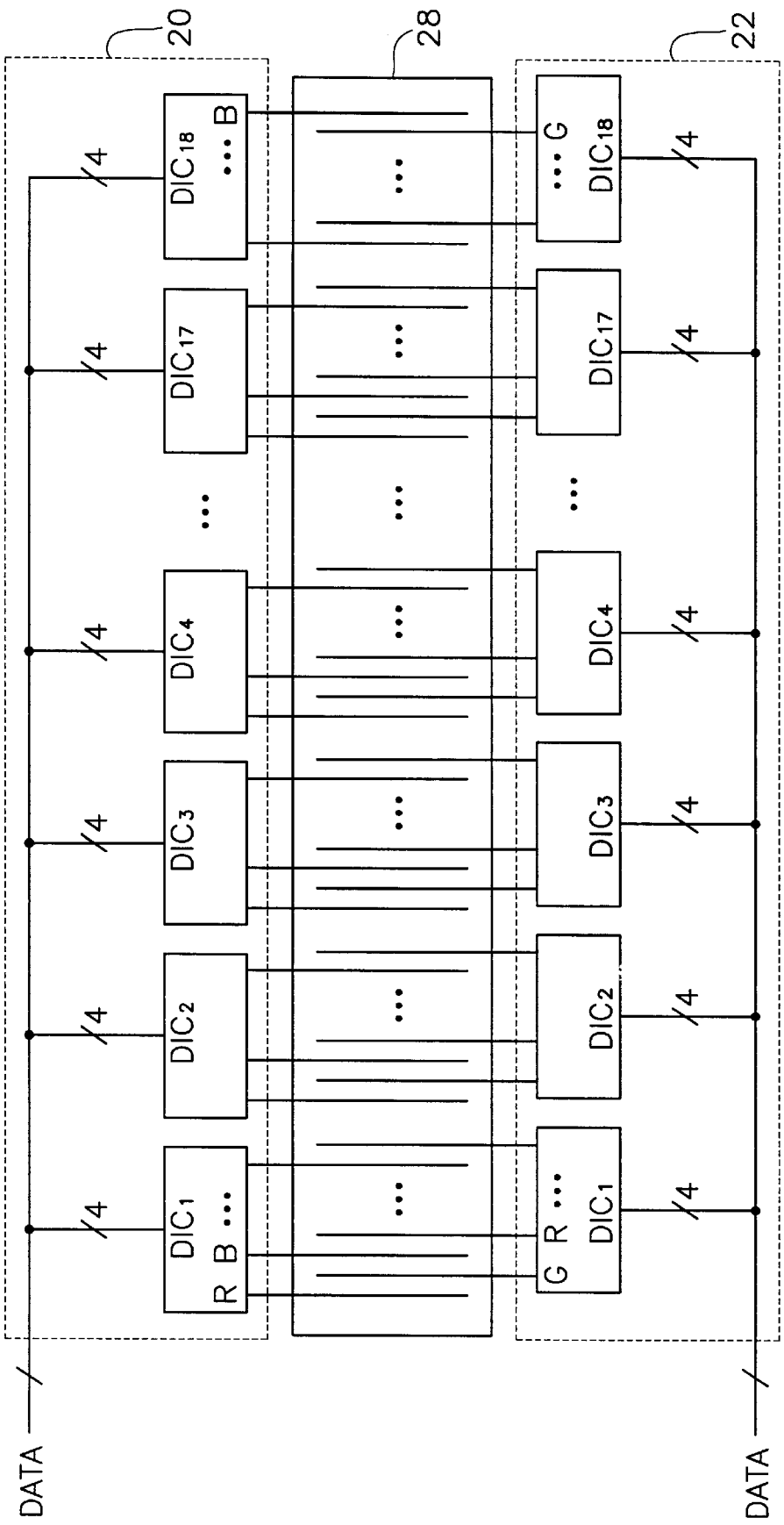
FIG. 2 is a view for showing a circuit diagram of a preferred first embodiment of an address electrode driving section according to the present invention.
Figure 3:
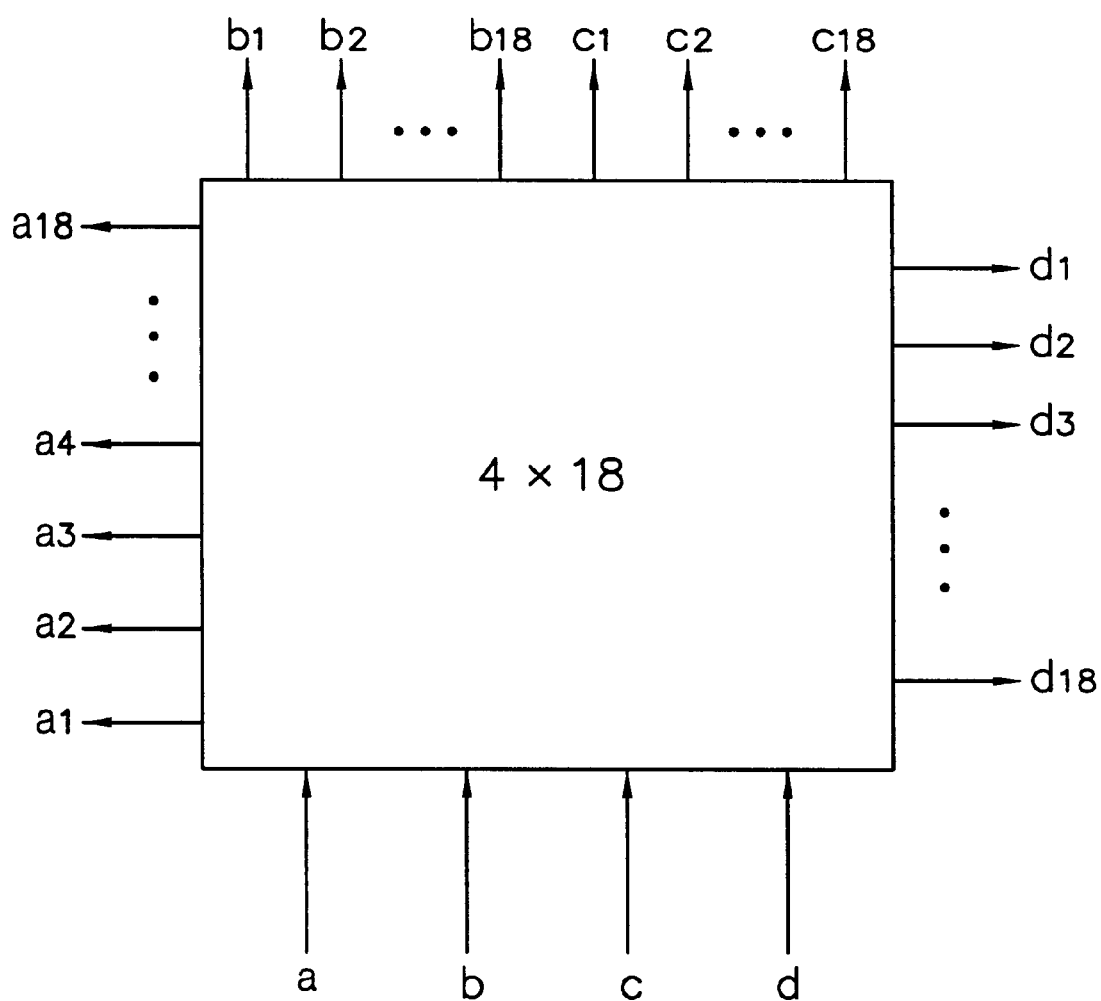
FIG. 3 is a view for showing a circuit diagram of each address electrode driving integrated circuit shown in FIG. 2.

FIG. 2 is a view for showing a circuit diagram of a preferred first embodiment of an address electrode driving section according to the present invention. FIG. 3 is a view for showing a circuit diagram of each address electrode driving integrated circuit shown in FIG. 2.

Referring to FIGS. 2 and 3, upper and lower address electrode driving sections 20 and 22 according to the first embodiment of the present invention have an address electrode driving IC which are arranged on upper and lower portions of display panel 20 by 18 units, respectively. Each of address electrode driving ICs has 4 inputs a, b, c and d and 72 output pins a1, ..., a18, b1, ..., b18, c1, ..., c18 and d1, ..., d18. Respective address electrode driving ICs receive 4 bits of RGB data from data interfacing section 14c through the 4 input pins a, b, c and d over 18 times. That is, one address electrode driving IC receives the RGB data of a total of 72 bits through 4 input pins a, b, c and d. Accordingly, upper and lower address electrode driving sections 20 and 22 receive 1296 units of the RGB data, respectively. At this time, since one line of display panel 20 needs 2559 units of the RGB data, there is invalid data such as 16 units of RGB data among the 1296 units of the RGB data inputted to upper address electrode driving section 20 and 17 units of the RGB data among the 1296 units of the RGB inputted to lower address electrode driving section 22.

As shown in FIG. 3, the RGB data inputted through first input pin a of the respective address electrode driving IC over 18 times are outputted through first to 18th ouput pins a1, ..., a18, respectively. The RGB data inputted through second input pin b over 18 times are outputted through 19th to 36th ouput pins b1, ..., b18, respectively. The RGB data inputted through third input pin c over 18 times are outputted through 37th to 54th ouput pins c1, ..., c18, respectively. The RGB data inputted through fourth input pin d over 18 times are outputted through 55th to 72th ouput pins d1, ..., d18, respectively.

Figure 4:
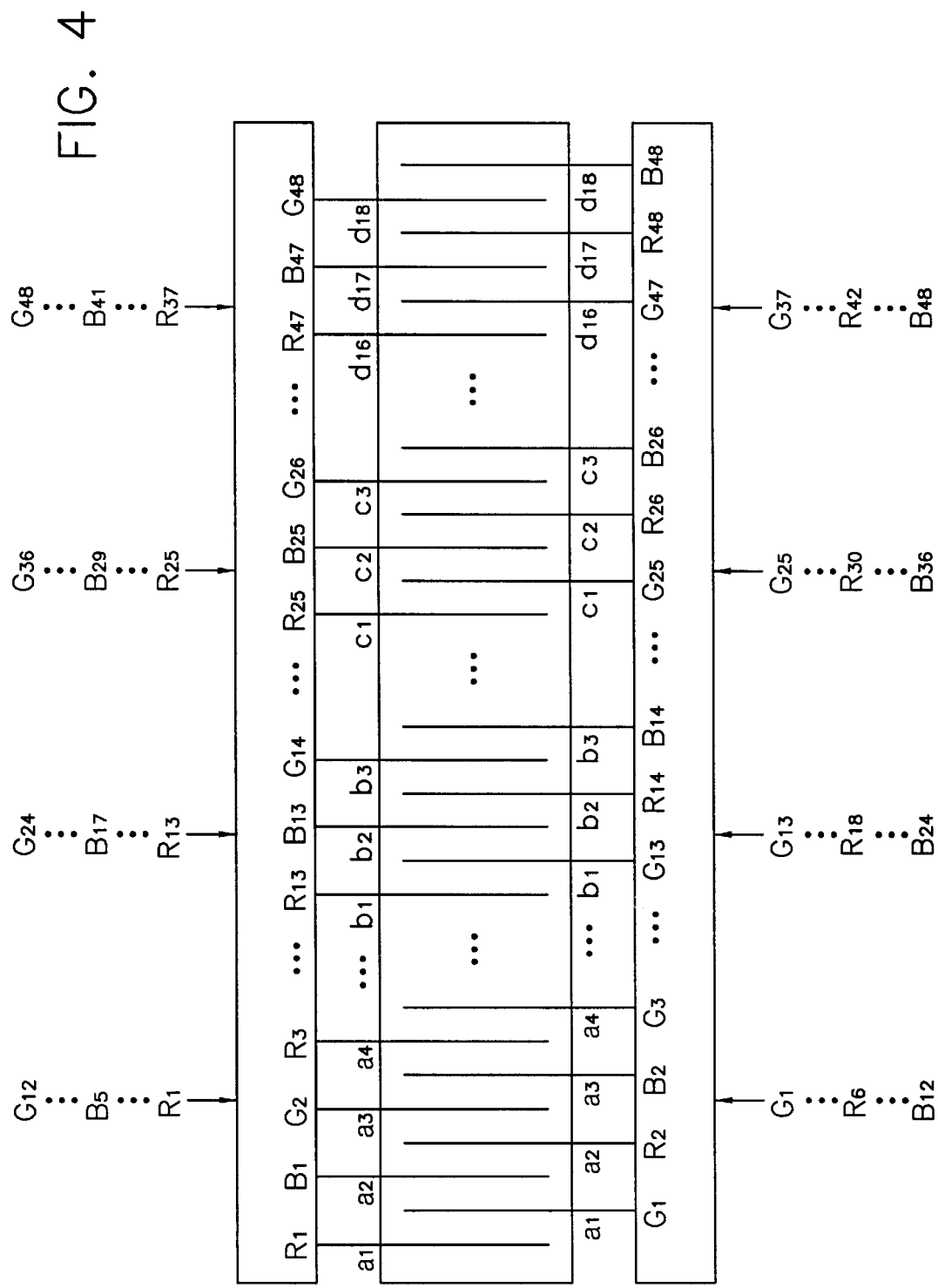
FIG. 4 is a view for showing a data input state of one address electrode driving integrated circuit shown in FIG. 3.

FIG. 4 is a view for showing a data input state of one address electrode driving integrated circuit shown in FIG. 3. Here, a first address electrode driving IC of upper address electrode driving section 20 and a first address electrode driving IC of lower address electrode driving section 22 are illustrated.

Referring to Table 2-1, when 4 units of R data R1, R13, R25 and R37 are inputted into first to fourth input pins a, b, c and d of the first address electrode driving IC of upper address electrode driving section 20, each of R data R1, R13, R25 and R37 are outputted through first, 19th, 27t and 55th output pins a1, b1, c1 and d1.

At this time, the first address electrode driving IC of lower address electrode driving section 22, based on the method described above, processes 4 units of G data G1, G13, G25 and G37 inputted from data interfacing section 14c as shown in FIG. 4 and Table 2-2.

Next, the first address electrode driving IC of upper address electrode driving section 20 receives 4 units of B data B1, B13, B25 and B37 through first to fourth input pins a, b, c and d from data interfacing section 14c, and each of B data B1, B13, B25 and B37 are outputted through second, 20th, 38th and 56th a2, b2, c2 and d2.

At this time, the first address electrode driving IC of lower address electrode driving section 22 processes 4 units of R data R2, R14, R26 and R38 inputted from data interfacing section 14c as shown in FIG. 4 and Table 2-2.

Next, the first address electrode driving IC of upper address electrode driving section 20 receives 4 units of G data G2, G14, G26 and G38 through first to fourth input pins a, b, c and d from data interfacing section 14c, and each of G data G2, G14, G26 and G38 are outputted through third, 21st, 39th and 57th a3, b3, c3 and d3.

At this time, the first address electrode driving IC of lower address electrode driving section 22 processes 4 units of B data B2, B14, B26 and B38 inputted from data interfacing section 14c as shown in FIG. 4 and Table 2-2.

That is, the first address electrode driving IC of upper address electrode driving section 20 receives data in the red, blue and green sequence, and the first address electrode driving IC of lower address electrode driving section 22 receives data in the green, red and blue.

Each of the address electrode driving ICs receives the RGB data of a total of 72 bits over 18 times with the method described above, and the inputted RGB data of the 72 bits are outputted to display panel 20 through 72 units of output pins a1, ..., a18, b1, b18, c1, ..., c18 and d1, ..., d18 arranged on the respective address electrode driving ICs.

At this time, since each of the address electrode driving ICs has the output pins corresponding to a multiple of 12, the RGB data arranged on an identical row of data interfacing section 14c having 12 columns ×107 rows are inputted to an identical address electrode driving IC. That is, each of the address electrode driving ICs has 72 units of output pins a1, ..., a18, b1, ..., b18, c1, ..., c18 and d1, ..., d18, so that the RGB data corresponding to 6 rows of data interfacing section 14C are processed in one address electrode driving IC. Accordingly, data interfacing section 14c can execute an output operation whenever the RGB data corresponding to the 6 rows have written although all of 1280 units of the ROB data are not inputted corresponding to upper and lower address electrode driving sections 20 and 22, respectively.

TABLE 2-1

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| a | R1 | B1 | G2 | R3 | B3 | G4 | R5 | B5 | G6 | R7 | B7 | G8 | R9 | B9 | G10 | R11 | B11 | G12 |
| b | R13 | B13 | G14 | R15 | B15 | G16 | R17 | B17 | G18 | R19 | B19 | G20 | R21 | B21 | G22 | R23 | B23 | G24 |
| c | R25 | B25 | G26 | R27 | B27 | G28 | R29 | B29 | G30 | R31 | B31 | G32 | R33 | B33 | G34 | R35 | B35 | G36 |
| d | R37 | B37 | G38 | R39 | B39 | G40 | R41 | B41 | G42 | R43 | B43 | G44 | R45 | B45 | G46 | R47 | B47 | G48 |

TABLE 2-2

|   | 1   | 2   | 3   | 4   | 5   | 6   | 7   | 8   | 9   | 10  | 11  | 12  | 13  | 14  | 15  | 16  | 17  | 18  |
|---|-----|-----|-----|-----|-----|-----|-----|-----|-----|-----|-----|-----|-----|-----|-----|-----|-----|-----|
| a | G1  | R2  | B2  | G3  | R4  | B4  | G5  | R6  | B6  | G7  | R8  | B8  | G9  | R10 | B10 | G11 | R12 | B12 |
| b | G13 | R14 | B14 | G15 | R16 | B16 | G17 | R18 | B18 | G19 | R20 | B20 | G21 | R22 | B22 | G23 | R24 | B24 |
| c | G25 | R26 | B26 | G27 | R28 | B28 | G29 | R30 | B30 | G31 | R32 | B32 | G33 | R34 | B34 | G35 | R36 | B36 |
| d | G37 | R38 | B38 | G39 | R40 | B40 | G41 | R42 | B42 | G43 | R44 | B44 | G45 | R46 | B46 | G47 | R48 | B48 |

Embodiment 2

Figure 5:
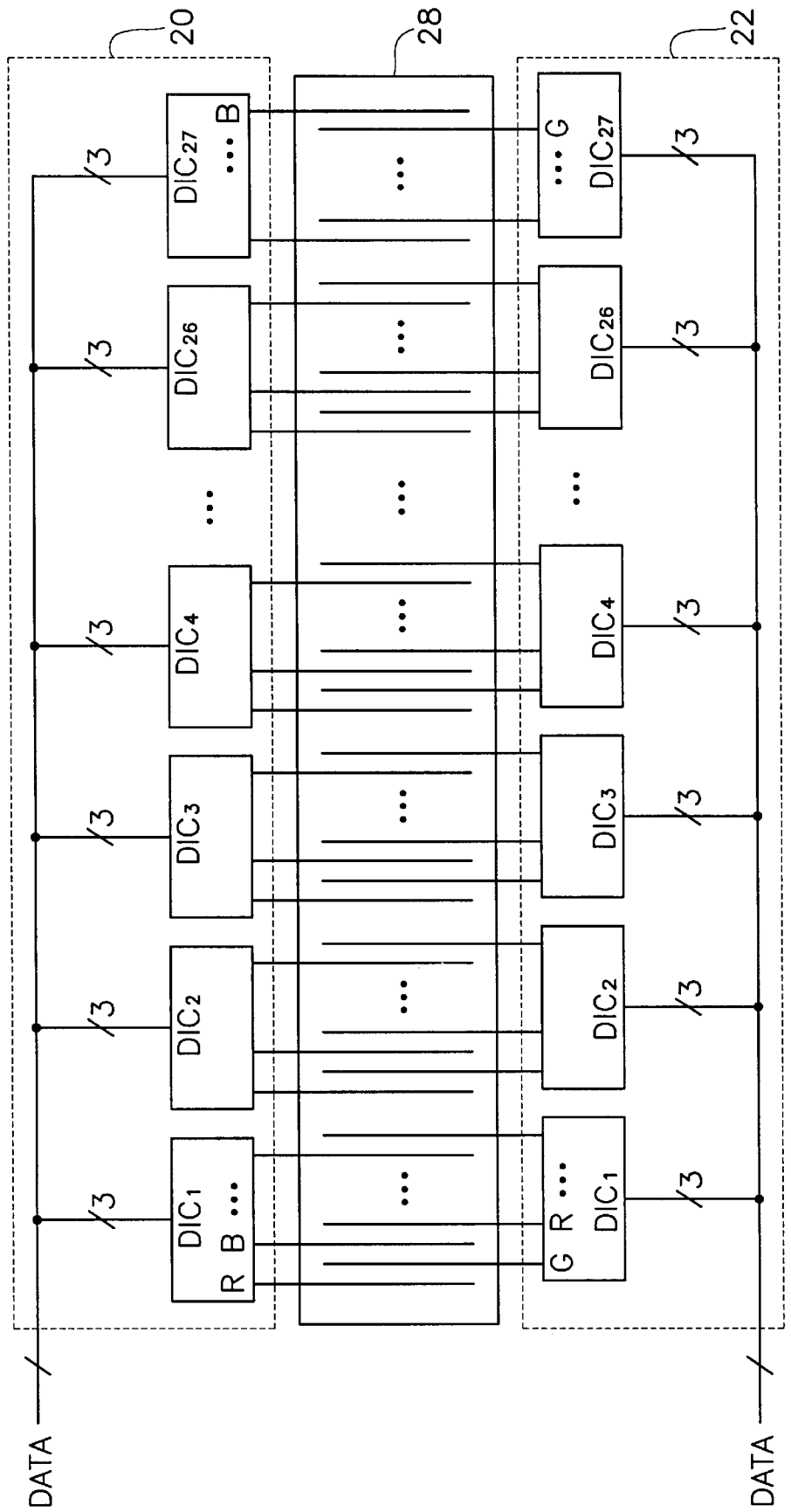
FIG. 5 is a view for showing a circuit diagram of a preferred second embodiment of an address electrode driving section according to the present invention.
Figure 6:
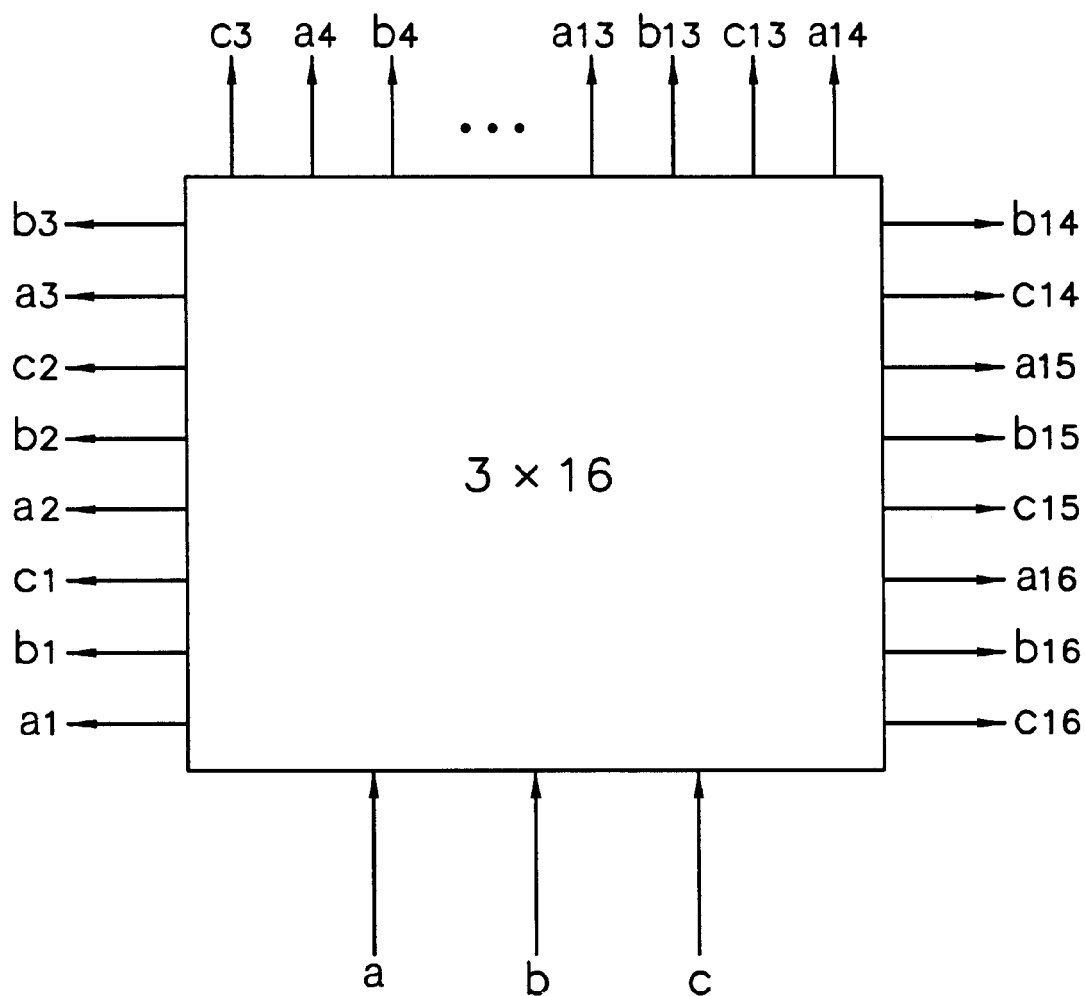
FIG. 6 is a view for showing a circuit diagram of each address electrode driving integrated circuit shown in FIG. 5.

FIG. 5 is a view for showing a circuit diagram of a preferred second embodiment of an address electrode driving section according to the present invention. FIG. 6 is a view for showing a circuit diagram of each address electrode driving integrated circuit shown in FIG. 5.

Referring to FIGS. 5 and 6, upper and lower address electrode driving sections 20 and 22 according to the second embodiment of the present invention have address electrode driving IC which are arranged on upper and lower portions of display panel 20 by 27 units, respectively. Each of address electrode driving ICs has 3 input pins a, b and c and 48 output pins a1, . . . , a16, b1, . . . , b16 and c1, . . . , c16. Respective address electrode driving ICs receive 3 bits of RGB data from data interfacing section 14c through the 3 input pins a, b and c over 16 times. That is, one address electrode driving IC receives the RGB data of a total of 48 bits through 3 input pins a, b and c. Accordingly, upper and lower address electrode driving sections 20 and 22 receive 1296 units of the RGB data, respectively. At this time, since the one line of display panel 20 needs 2559 units of the RGB data, there are invalid data such as 16 units of RGB data among the 1296 units of the RGB data inputted to upper address electrode driving section 20 and 17 units of the RGB data among the 1296 units of the RGB inputted to lower address electrode driving section 22.

As shown in FIG. 6, the RGB data inputted through first input pin a of the respective address electrode driving ICs over 16 times are outputted through first, fourth, seventh , . . . , 40th, 43rd and 46th ouput pins a1, . . . , a16, respectively. The RGB data inputted through second input pin b over 16 times are outputted through second, fifth, 8th, . . . 41st, 44th and 47th ouput pins b1, . . . , b16, respectively. The RGB data inputted through third input pin c over 16 times are outputted through third, sixth, ninth, . . . . . , 42nd, 45th and 48th output pins c1, . . . , c16, respectively.

Figure 7:
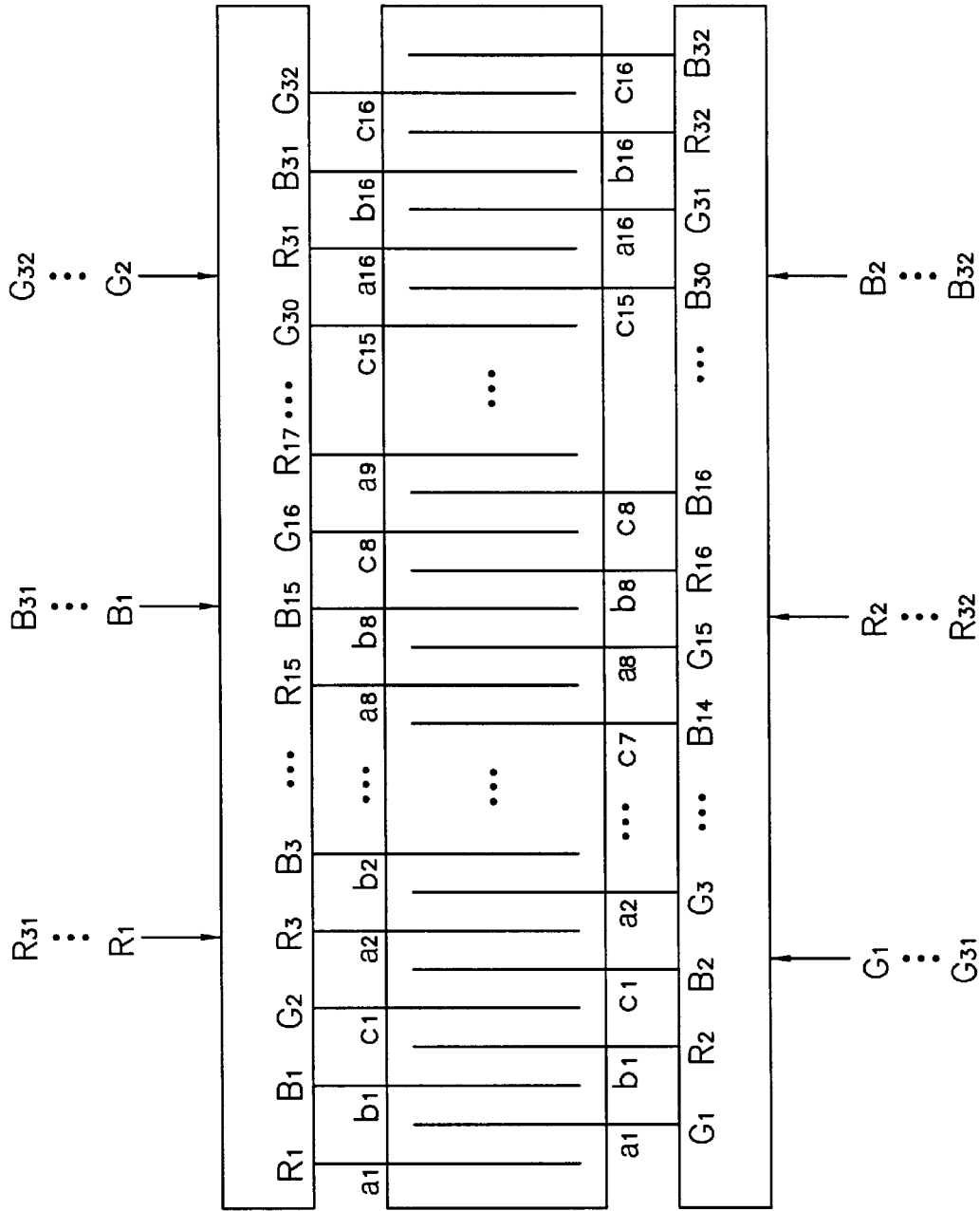
FIG. 7 a is view for showing a data input state of one address electrode driving integrated circuit shown in FIG. 6.

FIG. 7 is a view for showing a data input state of one address electrode driving IC shown in FIG. 6. Here, a first address electrode driving IC of upper address electrode driving section 20 and a first address electrode driving IC of lower address electrode driving section 22 are illustrated.

Referring to Table 3-1, when 3 units of RGB data R1, B1 and G2 are inputted respectively into first to third input pins a, b and c of the first address electrode driving IC of upper address electrode driving section 20, each of RGB data R1, B1 and G2 are outputted through first, second and third output pins a1, b1 and c1.

Referring to Table 3-2, at this time, the first address electrode driving IC of lower address electrode driving section 22, based on the method described above, processes 3 units of RGB data G1, R2 and B2 inputted from data interfacing section 14c as shown in FIG. 7 and Table 3-2.

Next, the first address electrode driving IC of upper address electrode driving section 20 receives 3 units of RGB data R3, B3 and G4 through first to third input pins a, b and c from data interfacing section 14c, and each of RGB data R3, B3 and G4 are outputted through fourth, fifth and sixth a2, b2 and c2.

At this time, the first address electrode driving IC of lower address electrode driving section 22 processes 3 units of RGB data G3, R4 and B4 inputted from data interfacing section 14c as shown in FIG. 7 and Table 3-2.

Next, the first address electrode driving IC of upper address electrode driving section 20 receives 3 units of RGB data R5, B5 and G6 through first to third input pins a, b and c from data interfacing section 14c, and each of RGB data R5, B5 and G6 are outputted through seventh, eighth and ninth a3, b3 and c3.

At this time, the first address electrode driving IC of lower address electrode driving section 22 processes 3 units of RGB data G5, R6 and B6 inputted from data interfacing section 14c as shown in FIG. 7 and Table 3-2.

That is, first input pin a of each of the address electrode driving ICs of upper address electrode driving section 20 receives the R data only, second input pin b of each of the address electrode driving ICs of upper address electrode driving section 20 receives the B data only, and third input pin c of each of the address electrode driving ICs of upper address electrode driving section 20 receives the G data only. Also, first input pin a of each of the address electrode driving ICs of lower address electrode driving section 22 receives the G data only, second input pin b of each of the address electrode driving ICs of lower address electrode driving section 20 receives the R data only, and third input pin c of each of the address electrode driving ICs of lower address electrode driving section 20 receives the B data only.

Each of the address electrode driving ICs receive the RGB data of a total of 48 bits over 16 times with the method described above, and the inputted 48 bits of the RGB data are outputted to display panel 20 through 48 units of output pins a1, . . . , a16, b1, . . . , b16 and c1, . . . , c16 arranged on the respective address electrode driving ICs.

At this time, since each of the address electrode driving ICs has the output pins corresponding to a multiple of 12, the RGB data arranged on an identical row of data interfacing section 14c having 12 columns ×107 rows are inputted to an identical address electrode driving IC. That is, each of the address electrode driving ICs has 48 units of output pins a1, . . . , a16, b1, . . . , b16 and c1, . . . , c16, so that the RGB data corresponding to 4 rows of data interfacing section 14c are processed in one address electrode driving IC. Accordingly, data interfacing section 14c can execute an output operation whenever the RGB data corresponding to the 4 rows have written although all of 1280 units of the RGB data are not inputted corresponding to upper and lower address electrode driving sections 20 and 22, respectively.

TABLE 3-1

|   | 1  | 2  | 3  | 4  | 5   | 6   | 7   | 8   | 9   | 10  | 11  | 12  | 13  | 14  | 15  | 16  |
|---|----|----|----|----|-----|-----|-----|-----|-----|-----|-----|-----|-----|-----|-----|-----|
| a | R1 | R3 | R5 | R7 | R9  | R11 | R13 | R15 | R17 | R19 | R21 | R23 | R25 | R27 | R29 | R31 |
| b | B1 | B3 | B5 | B7 | B9  | B11 | B13 | B15 | B17 | B19 | B21 | B23 | B25 | B27 | B29 | B31 |
| c | G2 | G4 | G6 | G8 | G10 | G12 | G14 | G16 | G18 | G20 | G22 | G24 | G26 | G28 | G30 | G32 |

TABLE 3-2

|   | 1  | 2  | 3  | 4  | 5   | 6   | 7   | 8   | 9   | 10  | 11  | 12  | 13  | 14  | 15  | 16  |
|---|----|----|----|----|-----|-----|-----|-----|-----|-----|-----|-----|-----|-----|-----|-----|
| a | G1 | G3 | G5 | G7 | G9  | G11 | G13 | G15 | G17 | G19 | G21 | G23 | G25 | G27 | G29 | G31 |
| b | R2 | R4 | R6 | R8 | R10 | R12 | R14 | R16 | R18 | R20 | R22 | R24 | R26 | R28 | R30 | R32 |
| c | B2 | B4 | B6 | B8 | B10 | B12 | B14 | B16 | B18 | B20 | B22 | B24 | B26 | B28 | B30 | B32 |

According to the embodiments of the present invention, the one address electrode driving IC processes the RGB data corresponding to the multiple of 12. Accordingly, in data interfacing section 14c having the RGB data arranged in 12 columns ×107 rows, the RGB data arranged on the identical row are inputted into an identical address electrode driving IC and are outputted to display panel 28.

That is, if a number of RGB data determined in accordance with a number of the input and output pins of each of the address electrode driving ICs are multiple of 12, data interfacing section 14c can execute an operation for outputting the RGB data although all of 1280 units of the RGB data are not inputted. Accordingly, the storage capacity of data interfacing section 14c can be reduced, and the cost of production of the flat panel display apparatus can be reduced.

While the present invention has been particularly shown and described with reference to a particular embodiment thereof, it will be understood by those skilled in the art that various changes in fonn and details may be effected therein without departing from the spirit and scope of the invention as defmed by the appended claims.

What is claimed is:

1. In an AC type plasma display panel system, a circuit for driving address electrodes of the plasma display panel system by using data representing red, green and blue stored in a frame memory, said circuit comprising:

a data interfacing means for temporarily storing the red, green and blue data supplied from said frame memory, wherein the red, green and blue data are stored in a matrix form of 12 columns×107 rows, and for outputting the stored red, green and blue data; and an address electrode driving means, having 4 input pins for receiving the red, green and blue data from said data interfacing means, for receiving the red, green and blue data from said data interfacing means and for outputting the received red, green and blue data to the address electrodes, wherein said address electrode driving means includes a plurality of address electrode driving integrated circuits which respectively have 72 output pins corresponding a multiple of the number 12.

2. In an AC type plasma display panel system, a circuit for driving address electrodes of the plasma display panel system by using data representing red, green and blue stored in a frame memory means, said circuit comprising:

a data interfacing means for temporarily storing the red, green and blue data supplied from said frame memory, wherein the red, green and blue data are stored in a matrix form of 12 columns×107 rows, and for outputting the stored red, green and blue data; and an address electrode driving means, which is having 3 input pins for receiving the red, green and blue data from said data interfacing means, for receiving the red, green and blue data from said data interfacing means and for outputting the received red, green and blue data to the address electrodes, wherein said address electrode driving means includes a plurality of address electrode driving integrated circuits which respectively have 48 output pins corresponding a multiple of the number 12.

* * * * *